United States Patent
Pettersson et al.

(10) Patent No.: US 10,818,197 B2
(45) Date of Patent: Oct. 27, 2020

(54) TEACHING MODE FOR CONSTRUCTION DEVICES

(71) Applicant: HUSQVARNA AB, Huskvarna (SE)

(72) Inventors: Ulf Pettersson, Tollered (SE); Johan Berg, Alingsås (SE); Anders Erestam, Gothenburg (SE)

(73) Assignee: HUSQVARNA AB, Huskvarna (SE)

( * ) Notice: Subject to any disclaimer, the term of this patent is extended or adjusted under 35 U.S.C. 154(b) by 454 days.

(21) Appl. No.: 15/448,780

(22) Filed: Mar. 3, 2017

(65) Prior Publication Data

US 2017/0263151 A1   Sep. 14, 2017

(30) Foreign Application Priority Data

Mar. 10, 2016 (SE) .................... 16503302

(51) Int. Cl.

| | | |
|---|---|---|
| G09B 19/24 | (2006.01) | |
| G09B 5/02 | (2006.01) | |
| G09B 5/06 | (2006.01) | |
| B28D 7/00 | (2006.01) | |
| B25F 5/00 | (2006.01) | |
| B28D 1/04 | (2006.01) | |
| B28D 1/14 | (2006.01) | |
| H04L 29/08 | (2006.01) | |

(52) U.S. Cl.
CPC ............ *G09B 19/24* (2013.01); *B25F 5/00* (2013.01); *B28D 1/04* (2013.01); *B28D 1/14* (2013.01); *B28D 7/005* (2013.01); *G09B 5/02* (2013.01); *G09B 5/06* (2013.01); *H04L 67/12* (2013.01)

(58) Field of Classification Search
CPC ............ B28D 1/04; B25F 5/00; G09B 19/24
See application file for complete search history.

(56) References Cited

U.S. PATENT DOCUMENTS

| | | | | |
|---|---|---|---|---|
| 4,896,357 | A * | 1/1990 | Hatano ................. | B25J 13/003 704/275 |
| 6,495,983 | B1 * | 12/2002 | Stern .................... | G05B 19/42 318/567 |
| 2013/0187587 | A1 * | 7/2013 | Knight .................. | H02P 6/08 318/400.37 |
| 2014/0107853 | A1 * | 4/2014 | Ashinghurst ......... | G05B 19/048 700/297 |
| 2016/0342142 | A1 * | 11/2016 | Boeck .................. | B24B 55/00 |
| 2017/0083014 | A1 * | 3/2017 | Conrad ............... | G05B 19/425 |
| 2017/0222382 | A1 * | 8/2017 | Peloquin ............. | B25F 5/00 |

FOREIGN PATENT DOCUMENTS

EP           2680093 A2      1/2014

* cited by examiner

*Primary Examiner* — Steve Rowland
(74) *Attorney, Agent, or Firm* — Burr & Forman, LLP (57) ABSTRACT

A construction site status monitoring device is provided including processing circuitry configured to receive teaching data from a construction device in a teaching mode based on an operator performing an operation with the construction device and generate an operation profile based on the teaching data for execution by one or more construction devices. The operation profile defines parameters associated with the operation to enable one or more construction devices to repeat the operation in an operate mode.

20 Claims, 4 Drawing Sheets

TEACHING MODE FOR CONSTRUCTION DEVICES

CROSS REFERENCE TO RELATED APPLICATIONS

This application claims priority to Swedish application number 1650330-2 filed Mar. 10, 2016, the entire contents of which are hereby incorporated by reference in its entirety.

TECHNICAL FIELD

Example embodiments generally relate to construction equipment and, more particularly, relate to a teaching mode for construction devices.

BACKGROUND

Construction equipment includes such devices as saws, drills, generators, nail guns, demolition robots, and the like. These devices are often used to perform tasks that inherently produce debris, and they are also inherently required to be mobile. Accordingly, these devices are typically made to be relatively robust and capable of handling difficult work in hostile environments, while balancing the requirement for mobility. However, these devices typically also include some form of working assembly or element that is capable of cutting working material, breaking working materials, drilling holes, driving nails or rivets, or the like.

In some instances, construction operations, such as relief cuts, stitch drilling, or other repetitive or patterned cuts may be required at a construction site. Typically, an operator or a group of operators perform the construction operations. Manually performing the construction operation may be labor intensive, time intensive, and subject to human error in the repeated operations. In some instances, such as setting concrete, construction operations, such as relief cuts, may need to be performed quickly and accurately before the concrete sets.

BRIEF SUMMARY OF SOME EXAMPLES

In an example embodiment, a construction site status monitoring device is provided including processing circuitry configured to receive teaching data from a construction device in a teaching mode based on an operator performing an operation with the construction device and generate an operation profile based on the teaching data for execution by one or more construction devices. The operation profile defines parameters associated with the operation to enable one or more construction devices to repeat the operation in an operate mode.

In another example embodiment, a construction site status monitoring system is provided including a plurality of construction devices comprising at least a fit construction device and a second construction device and a construction site status monitoring device. The construction site status monitoring device includes processing circuitry configured to receive teaching data from the first construction device in a teaching mode based on an operator performing an operation with the construction device and generate an operation profile based on the teaching data for execution by of the second construction device. The operation profile defines parameters associated with the operation to enable second construction device to repeat the operation in an operate mode.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide a construction site status monitoring device that may be employed on any of a number of different construction devices. The construction site status monitoring device may receive teaching data from a construction device in a teaching mode as an operator performs an operation while the construction device is in the teaching mode. The construction site status monitoring device may generate an operation profile based on the teaching data, including the depth, length, direction, or the like of the operation and/or device parameters such as force (applied and resistive), current, voltage, or the like. In an example embodiment, the construction device may cause one or more construction devices to perform the operation based on the operation profile.

In an example embodiment, an operator may enter an operation profile modification using a user interface to modify the operation profile generated in the teaching mode. Such modifications may include adjusting depth, length, or other parameters of the operation and/or entering threshold values for safe or proper operation of the construction device.

The operation profile may be utilized on the construction device used to generate the operation profile and/or one or more additional construction devices. The operation profile may be communicated to other construction devices through wireless communication, wired communication or transfer of a data storage medium, such as a flash memory.

In some example embodiments, the construction site status monitoring device may receive operating data from one or more of the construction devices in the operate mode as the operation is performed. Operating data may be data received from a construction device during execution of an operation profile in an operate mode, whereas teaching data may be data received from a construction device executing an operation in a teaching mode and used to generate the operation profile. In other words, the operating data may be the data received from a construction device while attempting to duplicate the teaching data of the operation profile.

The construction site status monitoring device may compare the operating data of the one or more construction devices to the operation profile and cause the one or more construction devices to shutdown in an instance in which the comparison of the operating data to the operation profile is indicative of a predetermined condition. The predetermined conditions may include excessive voltage and/or current or deviation from parameters of the operation profile, e.g. depth, length, or the like. Excessive voltage or current may be indicative of a change in the cutting material or a worn or damaged working element. In an example embodiment, the construction site status monitoring device may determine if the difference between the operating data and the operation profile satisfies a predetermined shutdown threshold and cause the shutdown of one or more of the construction devices based on satisfying the predetermine shutdown threshold. The predetermined shutdown threshold may be a current threshold, voltage threshold, distance/time threshold, or the like.

Figure 1:
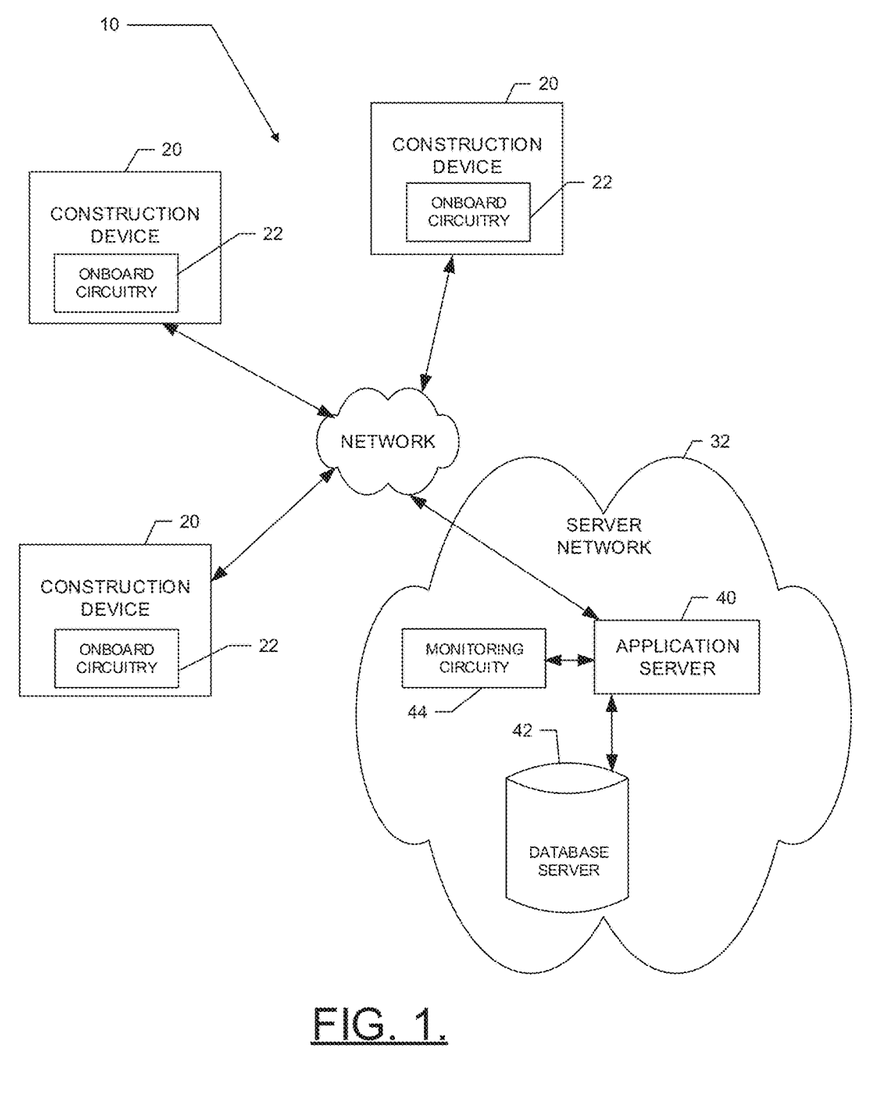
FIG. 1 illustrates a block diagram of a system according to an example embodiment.

FIG. 1 illustrates an example system in which an embodiment of the present invention may be employed. In this regard, FIG. 1 illustrates a generic example of a system in which various devices that are examples of construction equipment may utilize a network for the performance of construction site coordination according to an example embodiment. As shown in FIG. 1, a system 10 according to an example embodiment may include one or more client devices (e.g. construction devices 20). Notably, although FIG. 1 illustrates three construction devices 20 it should be appreciated that many more construction devices 20 may be included in some embodiments and thus, the three construction devices 20 of FIG. 1 are simply used to illustrate a multiplicity of construction devices 20 and the number of construction devices 20 is in no way limiting to other example embodiments. In this regard, example embodiments are scalable to inclusion of any number of construction devices 20 being tied into the system 10. Moreover, it should be appreciated that FIG. 1 illustrates one example embodiment in which shared resources may be allocated within a community of networked devices (e.g. construction devices 20). However, it should be appreciated that the architecture of various example embodiments may vary. Thus, the example of FIG. 1 is merely provided for ease of explanation of one example embodiment and should not be considered to be limiting with respect to the architecture of the system 10. Accordingly, for example, some embodiments may have specific sets of construction devices 20 that are associated with corresponding specific servers that belong to or are utilized by a particular organization, entity or group over a single network (e.g. network 30). However, in other embodiments, multiple different sets of construction devices 20 may be enabled to access other servers associated with different organizations, entities or groups via the same or a different network. Example embodiments, may also be practiced in individual devices not connected to any network.

The construction devices 20 may, in some cases, each include sensory, computing and/or communication devices associated with different construction devices 20 that belong to or are with a single organization, for example fleet management of devices 20 at a construction site. In another example, a first device 20 may be associated with a first facility or location of a first organization. Meanwhile, a second device may be associated with a second facility or location of the first organization. As such, for example, some of the construction devices 20 may be associated with the first organization, while other ones of the construction devices 20 are associated with a second organization. Thus, for example, the construction devices 20 may be remotely located from each other, collocated, or combinations thereof. However, in some embodiments, each of the construction devices 20 may be associated with individuals, locations or entities associated with different organizations or merely representing individual devices.

Each one of the construction devices 20 may include a housing inside which a power unit or motor (not shown) is housed. In some embodiments, the power unit may be an electric motor, an internal combustion engine, hydraulic system, pneumatic system, combustion chamber, or the like. The construction devices 20 may each further include a working element. The working element may be operated via the power unit to perform construction operations, such as drilling, cutting, demolishing, nailing, or the like. Various example types of construction devices 20 with which example embodiments may be associated should be understood to have corresponding different types of working elements (e.g. blades, cutting chains, drill bits, nailers, or the like). The construction devices 20 may include sensors for monitoring location, device operation, orientation, or the like, as discussed below in reference to FIG. 2.

In an example embodiment, each of the construction devices 20 may include onboard circuitry 22 which may include or otherwise be embodied as a computing device (e.g. processor, microcontroller, processing circuitry, or the like) capable of communication with a network 30. As such, for example, each one of the construction devices 20 may include (or otherwise have access to) memory for storing instructions or applications for the performance of various functions and a corresponding processor for executing stored instructions or applications and a corresponding processor or processing circuitry. Each one of the construction devices 20 may also include software and/or corresponding hardware (e.g. the onboard circuitry 22) for enabling the performance of the respective functions of the clients as described below. In an example embodiment, one or more of the construction devices 20 may be configured to execute applications or functions implemented via software for enabling a respective one of the construction devices 20 to communicate with the network 30 for requesting and/or receiving information and/or services via the network 30 and/or for providing data to other devices via the network 30. The information or services receivable at the construction devices 20 may include deliverable components (e.g. downloadable software to configure the onboard circuitry 22 of the construction devices 20, or information for consumption or utilization at the onboard circuitry 22 of the construction devices 20).

The network 30 may be a data network, such as a local area network (LAN), a metropolitan area network (MAN), a wide area network (WAN) (e.g. the Internet), and/or the like, which may couple the construction devices 20 to devices such as processing elements (e.g. personal computers, server computers or the like) and/or databases. Communication between the network 30, the construction devices 20 and the devices or databases (e.g. servers) to which the construction devices 20 are coupled may be accomplished by either wired or wireless communication mechanisms and corresponding communication protocols.

In an example embodiment, other devices to which the construction devices 20 may be coupled via the network 30 may include a server network 32 including one or more application servers (e.g. application server 40), and/or a database server 42, which together may form respective elements of the server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 may include monitoring circuitry 44 (which may be similar to or different from the onboard circuitry 22 of the construction devices 20) that may include hardware and/or software for configuring the application server 40 to perform various functions. As such, for example, the application server 40 may include processing logic and memory enabling the application server 40 to access and/or execute stored computer readable instructions for performing various functions.

In an example embodiment, one function that may be provided by the application server 40 (e.g. via the monitoring circuitry 44) may be the provision of services relating to generating an operation profile, as will be described in greater detail below. For example, the application server 40 may be local or remote and configured to receive data from the construction devices 20 and process the data to coordinate construction site operations as described herein. Thus, for example, the onboard circuitry 22 may be configured to send the data to the application server 40 for the application server to coordinate construction site operations (e.g. monitor and/or deploy personnel and/or construction device 20 to locations throughout the construction site), or have actions associated therewith (e.g. send information, alerts, or safety interlocks to construction devices 20). In some embodiments, the application server 40 may be configured to provide construction devices 20 with instructions (e.g. for execution by the onboard circuitry 22) for taking prescribed actions when corresponding teaching data or operating data is received.

Accordingly, in some example embodiments, data from construction devices 20 may be provided to and analyzed at the application server 40 to identify or define a construction site status (CSS) (e.g. in real time or at a later time). The CSS may be associated with actions to be taken by the corresponding one of the construction devices 20 that sent the data (or another device within the construction site) in response to a future detection of the CSS. The application server 40 may then equip one or more of the construction devices 20 to detect the defined CSS in the future, and also provide instructions for actions to be taken when the defined CSS is encountered. Each one of the construction devices 20 that has received the instructions may then detect the defined CSS and take the appropriate action. In one example embodiment, the CSS may be the generation of an operation profile for one or more construction devices 20 based on teaching data received from a construction device 20 in a teaching mode.

Alternatively or additionally, data from construction devices 20 may be provided to and analyzed at the application server 40 (e.g. in real time) to identify or define a CSS. The CSS may be associated with actions to be taken by the application server 40 in response to a future detection of the CSS. The application server 40 may then provide a report or warning or may direct action to be taken at one or more construction devices 20 when an occurrence of the defined CSS is detected in the future.

In still other embodiments, the construction devices 20 themselves may analyze data for detection of CSSs (e.g. using the onboard circuitry 22) and define and/or take action responsive to detecting the occurrence of a defined CSS. Thus, the construction devices 20 may operate in some cases independently of the network 30 and the application server 40. However, in some cases, the application server 40 may be used to provide defined CSSs to the construction devices 20 and the construction devices 20 may be configured thereafter to operate to detect CSSs and take actions correspondingly.

In some embodiments, for example, the onboard circuitry 22 and/or the monitoring circuitry 44 may include or have access to stored instructions for handling activities associated with practicing example embodiments as described herein. As such, in some embodiments, the onboard circuitry 22 and/or the monitoring circuitry 44 may include software and/or hardware for enabling the onboard circuitry 22 and/or the monitoring circuitry 44 to communicate via the network 30 for the provision and/or receipt of information associated with performing activities as described herein.

Figure 2:
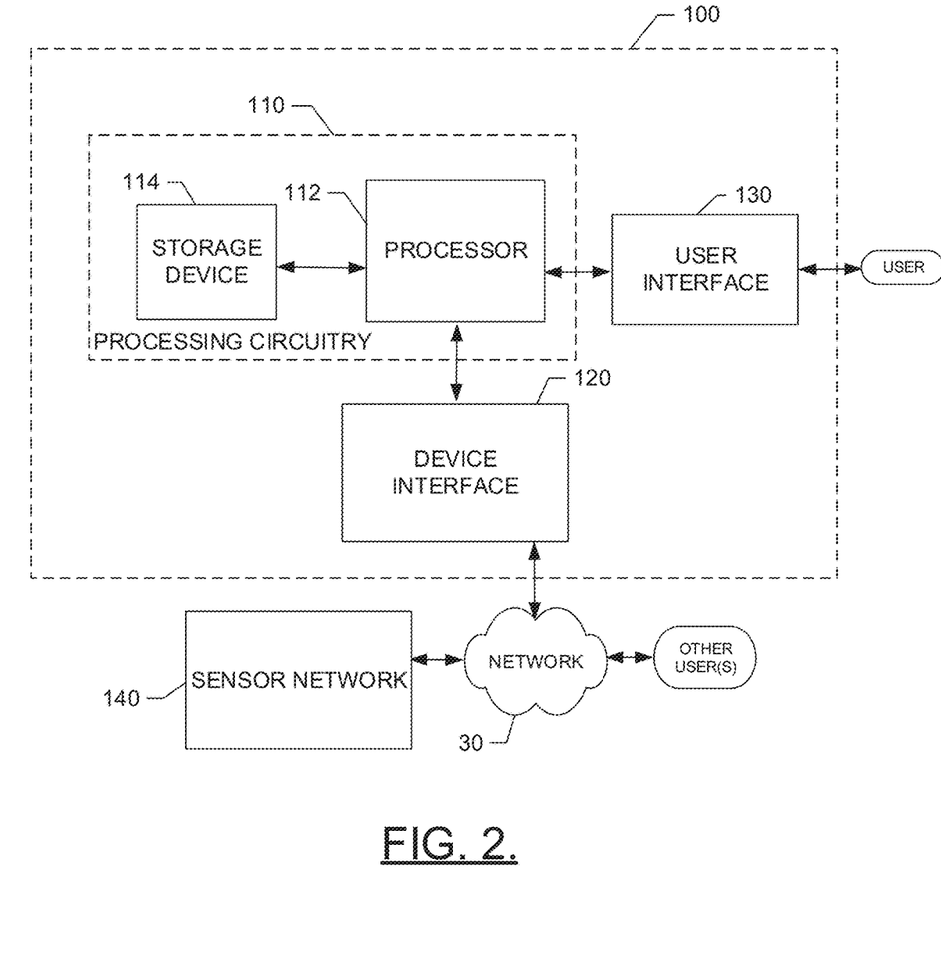
FIG. 2 illustrates a block diagram of one example of onboard electronics or monitoring circuitry that may be used in connection with employment of an example embodiment.

The system 10 of FIG. 1 may support CSS definition, detection and responses to detection on the basis of the execution of functionality that is executed using either or both of the onboard circuitry 22 and the monitoring circuitry 44. FIG. 2 illustrates a block diagram showing components that may be associated with embodiment of the onboard circuitry 22 and/or the monitoring circuitry 44 according to an example embodiment. As shown in FIG. 2, the onboard circuitry 22 and/or the monitoring circuitry 44 may include or otherwise be embodied as a CSS monitoring device 100. The CSS monitoring device 100 may be embodied in a construction device 20, a separate computing device, or be distributed among the devices 20, and/or a separate computing device. The CSS monitoring device 100 may include processing circuitry 110 of an example embodiment as described herein. In this regard, for example, the CSS monitoring device 100 may utilize the processing circuitry 110 to provide electronic control inputs to one or more functional units of the onboard circuitry 22 and/or the monitoring circuitry 44 and to process data generated by the one or more functional units regarding various indications of device activity (e.g. operational parameters and/or location information) relating to a corresponding one of the construction devices 20. In some cases, the processing circuitry 110 may be configured to perform data processing, control function execution and/or other processing and management services according to an example embodiment of the present invention. In some embodiments, the processing circuitry 110 may be embodied as a chip or chip set. In other words, the processing circuitry 110 may comprise one or more physical packages (e.g. chips) including materials, components and/or wires on a structural assembly (e.g. a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g. an integrated circuit chip) configured (e.g. with hardware, software or a combination of hardware and software) to perform operations described herein. However, in some embodiments, the processing circuitry 110 may be embodied as a portion of an on-board computer on a device being monitored (e.g. one of the construction devices 20), while in other embodiments, the processing circuitry 110 may be embodied as a remote computer that monitors device activity for one or more devices.

The user interface 130 may be in communication with the processing circuitry 110 to receive an indication of a user input at the user interface 130 and/or to provide an audible, visual, tactile or other output to the user. As such, the user interface 130 may include, for example, a display, one or more levers, switches, buttons or keys (e.g. function buttons), and/or other input/output mechanisms. In an example embodiment, the user interface 130 may include one or a plurality of lights, a display, a speaker, a tone generator, a vibration unit and/or the like. In some example embodiments, the user interface 130 may be remote, such as a display of a smart phone, personal data assistance, laptop computer, or the like.

The device interface 120 may include one or more interface mechanisms for enabling communication with other devices (e.g. sensors of the sensor network 140, or functional units of the CSS monitoring device 100 or other construction equipment on which an example embodiment may be employed). In some cases, the device interface 120 may be any means such as a device or circuitry embodied in either hardware, or a combination of hardware and software that is configured to receive and/or transmit data from/to sensors in communication with the processing circuitry 110 via internal communication systems of the CSS monitoring device 100. In some cases, the device interface 120 may further include wireless communication equipment (e.g. a one way or two way radio) for at least communicating information from the CSS monitoring device 100 to a network and, in the case of a two way radio, in some cases receiving information from a network.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g. physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the operation of the CSS monitoring device 100 based on inputs received by the processing circuitry 110. As such, in some embodiments, the processor 112 (or the processing circuitry 110) may be said to cause each of the operations described in connection with the CSS monitoring device 100 in relation to operation the CSS monitoring device 100 relative to undertaking the corresponding functionalities associated therewith responsive to execution of instructions or algorithms configuring the processor 112 (or processing circuitry 110) accordingly.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, the CSS monitoring device 100, or any other functional units that may be associated with the CSS monitoring device 100. Among the contents of the memory 114, applications may be stored for execution by the processor 112 in order to carry out the functionality associated with each respective application. In some cases, the applications may include instructions for recognition of patterns of activity and for initiation of one or more responses to the recognition of any particular pattern of activity as described herein. Additionally or alternatively, the applications may prescribe particular reporting paradigms or protocols for reporting of information from the outdoor power tool activity monitoring device 100 to a network device using the device interface 120.

In some embodiments, the processing circuitry 110 may communicate with electronic components and/or sensors of a sensor network 140 (e.g. sensors that measure variable values related to device operational parameters like RPM, temperature, oil pressure, cut depths, cut lengths, and/or the like, and/or sensors that measure device movement employing movement sensor circuitry) of the construction device 20 via the device interface 120. In one embodiment, sensors of the sensor network 140 of one or more ones of the construction devices 20 may communicate with the processing circuitry 110 of a remote monitoring computer via the network 30 and the device interface 120 using wireless communication or by downloading data that is transferred using a removable memory device that is first in communication with the construction device 20 to load data indicative of device activity, and is then (e.g. via the device interface 120) in communication with the remote monitoring computer (e.g. associated with the monitoring circuitry 44).

In some embodiments, the processing circuitry 110 may communicate with movement sensor circuitry of the construction device 20 (e.g. when the processing circuitry 110 is implemented as the onboard circuitry 22), or may receive information indicative of device location from movement sensor circuitry of one or more devices being monitored (e.g. when the processing circuitry is implemented as the monitoring circuitry 44). The movement sensor circuitry may include movement sensors (e.g. portions of the sensor network 140) such as one or more accelerometers and/or gyroscopes, or may include global positioning system (GPS) or other location determining equipment.

Figure 3:
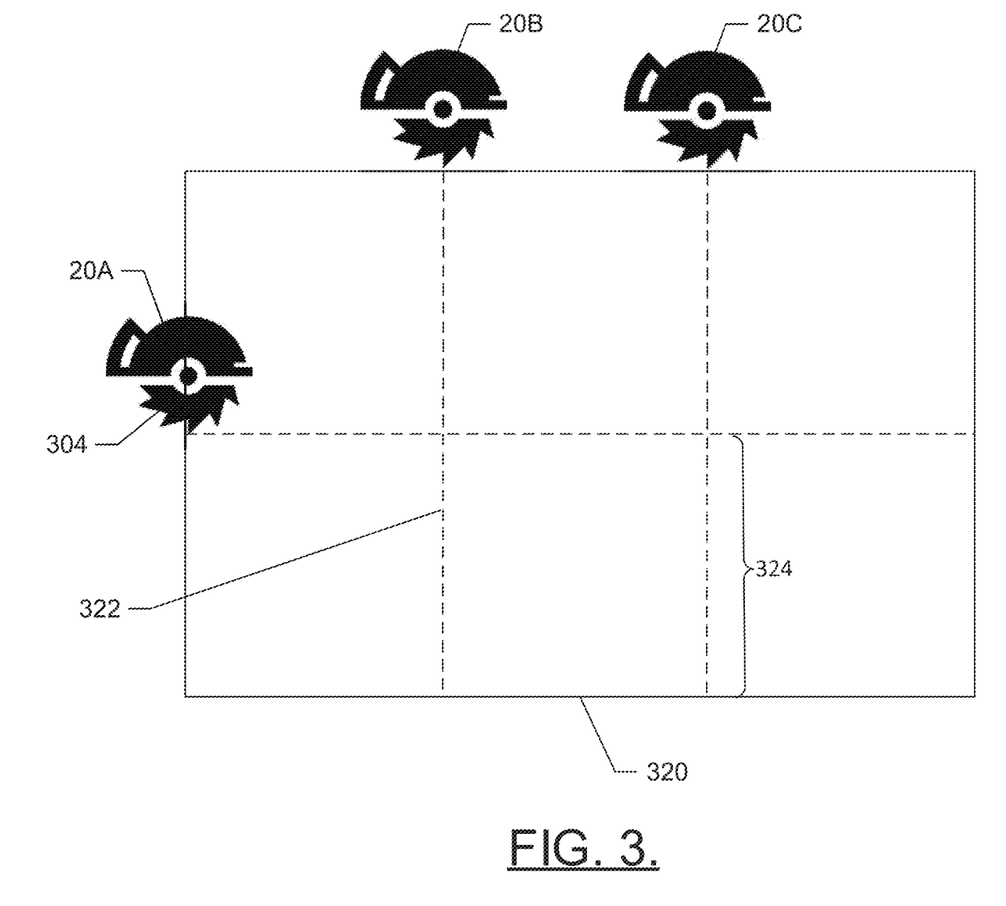
FIG. 3 illustrates an example construction site according to an example embodiment.

The movement sensor circuitry (if employed) may be configured to provide indications of movement of the construction device 20 based on data provided by the one or more accelerometers and/or gyroscopes, and/or based on GPS or local position determining capabilities. In other words, the movement sensor circuitry may be configured to detect movement of the construction device 20 based on inertia-related measurements or other location determining information. In some example embodiments, the movement sensor circuitry may include orientation sensors, configured to detect the orientation of a device, particularly the working element of the device relative the a determined location FIG. 3 illustrates an example construction site according to an example embodiment. The construction site may include one or more construction devices 20, such as saws, drills, grinders, or the like. The construction device 20 may include a working element 304, such as a blade, drill bit, grinding head, nailer, or the like, configured to perform work such as cutting, drilling, grinding or fastening, on a working material 320. The working material may be wood, drywall, plaster board, concrete, brick, stone, or other materials. In an example embodiment, it may be desirable to perform a series of operations, such as a drill or cut pattern, on the working material 320. A CSS may include generating an operation profile for execution by one or more construction devices to perform an operation, based on teaching data received from a construction device in a teaching mode.

In some example embodiments, the CSS monitoring device 100 may receive an indication that a construction device 20A, for an example a concrete saw, is in a teaching mode. The CSS monitoring device 100 may receive teaching data from the construction device 20A while the construction device 20A remains in the teaching mode. The teaching data may be received from one or more sensors (e.g. a portion of the sensor network 140) associated with the construction device 20A, such as current sensors, voltage sensors, location sensors, accelerometers, or the like. An operator may perform an operation, such as a cut pattern, drill pattern, a fastener pattern, or other repetitive operation using the construction device 20A in the teaching mode. Some example operations may include a relief cut pattern in a concrete pad, stitch drilling, wall sawing, component fastening, or the like.

The CSS monitoring device 100 may generate an operation profile based on the teaching data received while the construction device 20A performed the operation in the teaching mode. The operation profile may include a cut depth, cut length, operation time (e.g. run time), force applied, resistive force, voltage and/or current, direction and/or orientation of the construction device 20A during the operation, or the like. In some example embodiments, the operation profile may include a reference point for the operation, such as wall, ceiling, floor, change in elevation (e.g. curb, stairs, riser, or the like), a previous operation (e.g. cut, drill hole, fastener, or the like). In an example embodiment, the operation profile may also include a distance or orientation from the reference point at which to perform the operation. In the example construction site depicted in FIG. 3, the operation may be a relief cut 324 of a relief cut pattern 322 in a working material 320, e.g. a concrete pad. The operation profile may be a single cut 324 or a plurality of cuts including orientation of the cuts and distances from a reference point such as the first cut, a wall, or the like.

In some example embodiments, the CSS monitoring device 100 may receive operation profile modifications. The CSS monitoring device 100 may cause the operation profile to be displayed on a user interface, such as user interface 130. An operator may review the operation profile and enter operation profile modifications. Operation profile modifications may include adjustments, to the depth of a cut or drill, adjustment to the orientation or distance from a reference point, adjustments to the force applied, or the like. In some example embodiments, the operation profile modifications may include one or more predetermined shutdown or warning thresholds.

In an example embodiment in which the operation profile include a profile of a single operation, e.g. drill or cut, and a pattern, such as stitch drilling or a relief cut pattern, or repetition of the operation is desired, the operation profile modification may include a specification of the pattern or specification of the repetition of the single operation. In some instances, the operation profile modification may include the reference point and the changes to the direction and/or orientation of the construction device 20.

The operation profile may be executed on the construction device 20A which was used to generate the operation profile and/or one or more additional construction devices 20B, 20C. The operation profile may be communicated to the additional construction devices 20B, 20C using wired or wireless communication, or in some instances physically transferred on a data storage medium, such as flash memory.

The CSS monitoring device 100 may receive an indication of one or more construction devices 20 in an operate mode, which may in some instances include the construction device 20A used to generate the operation profile. In some example embodiments, the CSS monitoring device 100 may determine the desired type of construction device and operation start locations based on the operation profile. In an instance in which one or more of the construction devices 20 is determine to be the desired type of construction device 20 and is located in the desired operation start location, the CSS monitoring device 100 may cause one or more of the construction devices to perform the operation based on the operation profile. In the depicted example of FIG. 3, the construction devices 20A, 20B, and 20C may make relief cuts 324 in the relief cut pattern 322 in the working material 320.

In some example embodiments, the CSS monitoring device 100 may receive operating data from the one or more construction devices 20 performing the operation in the operate mode, for example construction device 20B. The operating data may be received from one or more sensors (e.g. a portion of the sensor network 140) associated with the construction device 20B, such as current sensors, voltage sensors, location sensors, accelerometers, or the like. Operating data may be data received from a construction device 20B during execution of an operation profile in an operate mode, whereas teaching data may be data received from a construction device 20A executing an operation in a teaching mode and used to generate the operation profile.

The CSS monitoring device 100 may compare the operating data from the one or more construction devices 20 to the operation profile. The CSS monitoring device 100 may include one or more predetermined warning or shutdown thresholds. The warning and/or shutdown thresholds may be manually set, such as an operation profile modification, as discussed above, or automatically determined. The predetermined warning or shutdown threshold may be a value or change in value of one or more parameters of the operating data. Satisfying one or more of the predetermined warning or shutdown threshold may be indicative of a deviation from the operation profile, such as a cut or drill in an incorrect location, or progressing toward an incorrect location, damage or wear of the working element 304, or other undesirable condition. In an instance in which the operating data, or comparison of the operating data to the operation profile satisfies one or more predetermined warning thresholds, the CSS monitoring device 100 may cause a warning to be transmitted or an indicator to be actuated. The warning may be a light, alarm, on screen display, a tactile feedback, or the like on a construction device 20B in the operate mode, the CSS monitoring device 100, or construction device 20A in the teaching mode. In an instance in which the operating data, or comparison of the operating data to the operation profile satisfies one or more predetermined shutdown thresholds, the CSS monitoring device 100 may cause one or more of the construction devices 20 to shutdown, including the construction device 20B which provided the operating data satisfying the shutdown threshold.

Figure 4:
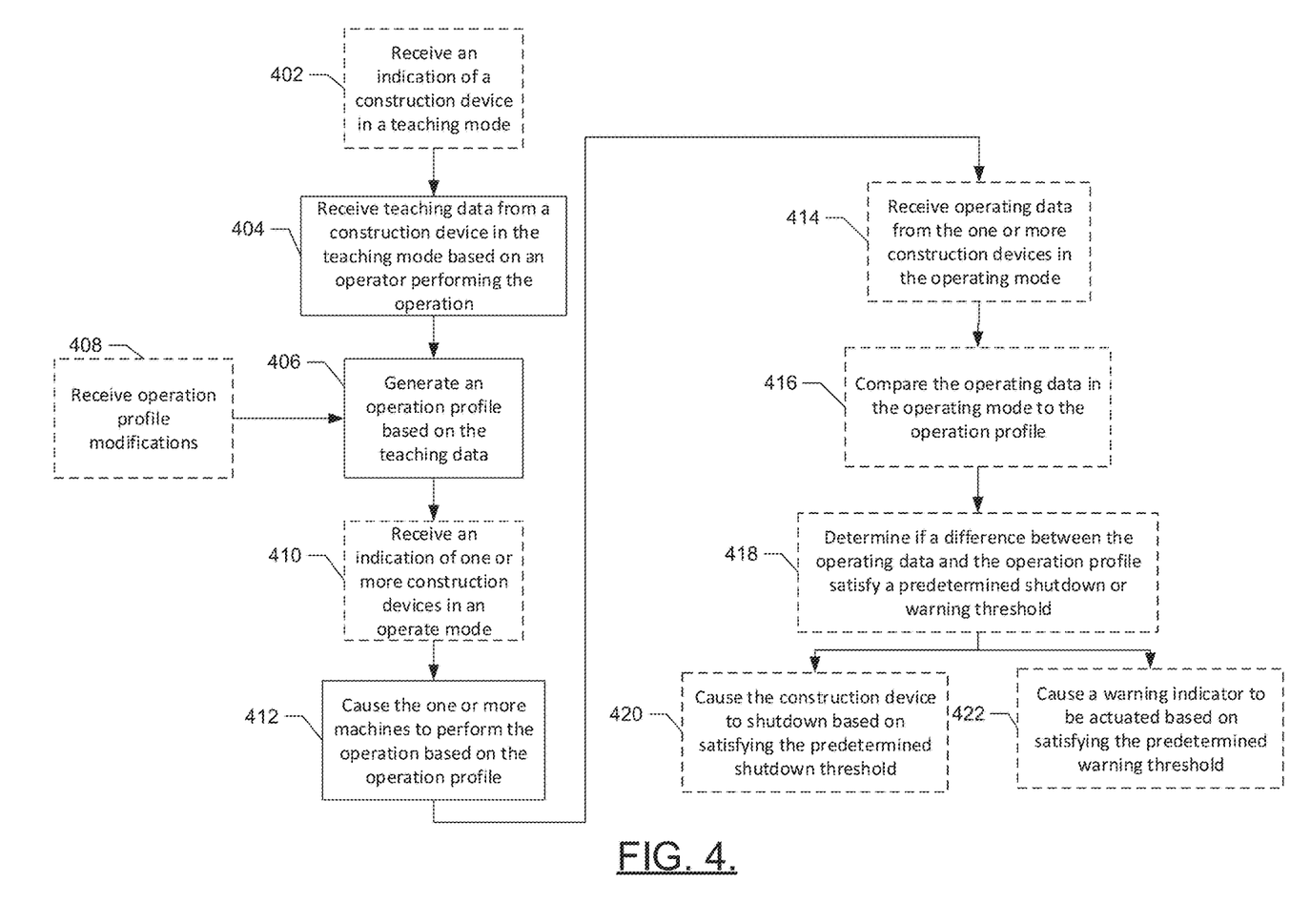
FIG. 4 illustrates a method of utilizing construction site status monitoring device in relation to operation of a construction device according to an example embodiment.

In some cases, a method of utilizing CSS analysis in relation to operation of the CSS monitoring device 100 and/or one or more construction devices 20 according to an example embodiment may be provided. FIG. 4 illustrates a block diagram of some activities that may be associated with one example of such a method. In some embodiments, the processing circuitry 110 (which may include a processor capable of executing instructions stored in a non-transitory computer readable medium/memory) may be configured to implement a control algorithm for the CSS monitoring device 100 and/or the one or more construction tools according to the method.

In an example embodiment, the method may include receiving teaching data from a construction device in a teaching mode based on an operator performing an operation at operation 404, generate an operation profile based on the teaching data at operation 406, and causing one or more machines to perform the operation based on the operation profile at operation 412.

In some embodiments, the method may include additional, optional operations, and/or the operations described above may be modified or augmented. Some examples of modifications, optional operations, and augmentations are described below, as indicated by dashed lines, such as, receiving an indication of a construction device in a teaching mode at operation 402, receiving operation profile modifications at operation 410, and receive an indication of one or more construction devices in an operate mode at operation 412. In some example embodiments, the method may also include receiving operating data from the one or more construction devices in the operating mode at operation 414, comparing the operating data in the operating mode to the operation profile at operation 416, determining if a difference between the operating data and the operation profile satisfy a predetermined shutdown or warning threshold at operation 418, and/or causing the construction device to shutdown based on the satisfying the predetermined shutdown threshold at operation 420. In an example embodiment, the method may also include causing a warning indicator to be actuated based on the satisfying the predetermined warning threshold at operation 422.

In an example embodiment, the CSS monitoring device may comprise a processor (e.g. the processor 112) or processing circuitry 110 configured to perform some or each of the operations (402-422) described above. The processor 112 may, for example, be configured to perform the operations (402-422) by performing hardware implemented logical functions, executing stored instructions, or executing algorithms for performing each of the operations. In some embodiments, the processor 112 or processing circuitry 110 may be further configured for additional operations or optional modifications to operations 402-422. In this regard, in an example embodiment, enabling the one or more construction devices to perform the operation based on the operation profile includes employing the operation profile to repeat the operation in the operate mode automatically. In some example embodiments, enabling the one or more construction devices to perform the operation based on the operation profile comprises employing the operation profile to repeat the operation in the operate mode with operator feedback. In some example embodiments, the operation profile is communicated to the one of more construction devices through wired or wireless communication for execution in the operate mode. In an example embodiment, the operation profile is transferred to the one or more construction devices via a data storage medium for execution in the operate mode. In some example embodiments, the processing circuitry is further configured to compare the operating data of the one or more construction devices to the operation profile and cause the one or more construction devices to shutdown based on the comparison of the operating data to the operation profile being indicative of a predetermined shutdown condition. In an example embodiment, the processing circuitry is further configured to determine if a difference between the operating data and the operation profile satisfies a predetermined shutdown threshold and causing the one or more of the plurality of construction devices to shutdown is further based on satisfying the predetermined shutdown threshold. In an example embodiment, the operation profile includes a cut pattern or drill pattern. In some example embodiments, the cut pattern or drill pattern includes a reference position, a direction and an amount of motion from the reference position. In an example embodiment, the processing circuitry is further configured to receive operation profile modification data from a user interface and the operation profile is further based on the operation profile modification data. In an example embodiment, the first construction device comprises the construction site status monitoring device. In some example embodiments, the second construction device performs at least one repetition of the operation based on the operation profile.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be That which is claimed is:

1. A construction site status monitoring device comprising processing circuitry configured to:
   receive teaching data from a first construction device in a teaching mode based on an operator performing an operation with the first construction device;
   generate an operation profile based on the teaching data for execution by the first construction device or a second construction device, wherein the operation profile defines parameters associated with the operation to enable the first construction device or the second construction device to repeat the operation in an operate mode;
   receive operating data transmitted from the first construction device or the second construction device operating based on the operation profile in the operate mode;
   compare the operating data to the operation profile to determine a deviation of the operating data from the operation profile; and
   transmit a warning communication to the first construction device or the second construction device in response to the deviation of operating data from the operation profile satisfying a warning threshold, or transmit a shutdown communication to the first construction device or the second construction device in response to the deviation of operating data from the operation profile satisfying a shutdown threshold.

2. The construction site status monitoring device of claim 1, wherein the processing circuitry is further configured to transmit the operation profile to the first construction device or the second construction device to enable the first construction device or the second construction device to repeat the operation based on the operation profile automatically.

3. The construction site status monitoring device of claim 1, wherein the processing circuitry is further configured to transmit the operation profile to the first construction device or the second construction device to enable the first construction device or the second construction device to repeat the operation based on the operation profile with feedback as the operating data.

4. The construction site status monitoring device of claim 1, wherein the operation profile is communicated to the first construction device or the second construction device through a wired or wireless communication for execution in the operate mode.

5. The construction site status monitoring device of claim 1, wherein the operation profile is transferred to the first construction device or the second construction device via a removable data storage medium for execution in the operate mode.

6. The construction site status monitoring device of claim 1, wherein the processing circuitry is further configured to:
   cause, via the shutdown communication, the first construction device or the second construction device to shutdown.

7. The construction site status monitoring device of claim 1, wherein the operation profile comprises a cut pattern or drill pattern.

8. The construction site status monitoring device of claim 7, wherein the cut pattern or drill pattern includes a reference position, a direction, and an amount of motion from the reference position.

9. The construction site status monitoring device of claim 1, wherein the processing circuitry is further configured to:
   receive operation profile modification data from a user interface;
   wherein the operation profile is further based on the operation profile modification data.

10. A construction site status monitoring system comprising:
    a plurality of construction devices comprising at least a first construction device and a second construction device; and
    a construction site status monitoring device comprising processing circuitry configured to:
      receive teaching data from the first construction device in a teaching mode based on an operator performing an operation with the first construction device;
      generate an operation profile based on the teaching data for execution by the second construction device and a spatial pattern of operations, wherein the operation profile defines parameters associated with the operation to enable the second construction device to repeat the operation in an operate mode in accordance with the spatial pattern of operations;
      receive an indication of the second construction device being in the operate mode; and
      in response to the indication of the second construction device being in the operate mode, cause the second construction device to operate based on the operation profile and repeat the operation conducted by the first construction device in the teaching mode in accordance with the spatial pattern of operations.

11. The construction site status monitoring system of claim 10, wherein the processing circuitry is further configured to transmit the operation profile to the second construction device to enable the second construction device to repeat the operation based on the operation profile automatically or with feedback.

12. The construction site status monitoring system of claim 10, wherein the first construction device comprises the construction site status monitoring device.

13. The construction site status monitoring system of claim 10, wherein the operation profile is communicated to the second construction device through a wired communication, a wireless communication, or via a removable storage medium for execution in the operate mode.

14. The construction site status monitoring system of claim 10, wherein the processing circuitry is further configured to:
    receive operating data from the second construction device in the operate mode.

15. The construction site status monitoring system of claim 14, wherein the processing circuitry is further configured to:
    compare the operating data of the second construction device to the operation profile to determine a deviation of the operating data from the operation profile; and
    wirelessly transmit a warning communication to the second construction device in response to the deviation of the operating data from the operation profile satisfying a warning threshold.

16. The construction site status monitoring system of claim 14, wherein the processing circuitry is further configured to:
    compare the operating data of the second construction device to the operation profile to determine a deviation of the operating data from the operation profile; and wirelessly transmit a shutdown communication to the second construction device in response to the deviation of the operating data from the operation profile satisfying a shutdown threshold to cause the second construction device to shutdown.

17. The construction site status monitoring system of claim 10, wherein the spatial pattern of operations comprises a cut pattern of operations or a drill pattern of operations.

18. The construction site status monitoring system of claim 10, wherein the processing circuitry is further configured to generate the operation profile based on a reference point associated with the spatial pattern of operations.

19. The construction site status monitoring system of claim 10, wherein the processing circuitry is further configured to generate the operation profile based on distances of operations from a reference point associated with the spatial pattern of operations.

20. The construction site status monitoring system of claim 10, wherein the processing circuitry is further configured to generate the operation profile based on distances of operations from a reference point and device orientations for the operations associated with the spatial pattern of operations.

* * * * *